Dec. 6, 1955 D. C. GREEN 2,725,749
PRESSURE GAGE PROTECTOR
Filed March 30, 1951

INVENTOR.
Donald C. Green
BY
Harry P. Canfield
ATTORNEY.

United States Patent Office 2,725,749
Patented Dec. 6, 1955

2,725,749

PRESSURE GAGE PROTECTOR

Donald C. Green, Russell Township, Geauga County, Ohio

Application March 30, 1951, Serial No. 218,305

2 Claims. (Cl. 73—395)

This invention relates to fluid pressure responsive apparatus, and particularly to means for protecting such apparatus from the damaging effects of excess pressures and surges of the operating fluid.

Some of the advantages of the invention may be had when the fluid is gaseous; but the full advantages of the invention are probably best developed when the fluid is liquid, and will therefore be described herein as used with liquid.

While the invention may be applied to protect various types of pressure responsive apparatus, instruments, etc., in order to make a simple concrete disclosure of the invention, it will be described herein in connection with a pressure indicating gage; the scope of the invention in this respect being that of the appended claims.

Among the objects of the invention are:

To provide an improved device which may be installed between a pressure indicating gage or like liquid pressure responsive apparatus, and the conduit that supplies the actuating pressure to be indicated, and which will respond to cut off the actuating pressure to the gage when it reaches a predetermined maximum.

To provide an improved device of the type referred to provided with adjusting means by which the pressure at which it effects cut-off as aforesaid may be preselected.

To provide an improved device of the type referred to, which isolates the operating liquid in the gage from the actuating liquid whose pressure is to be indicated, whereby a gage operating liquid having preferred selected properties may be used regardless of the properties of the actuating liquid.

To provide, in a device of the type referred to, an improved valve which closes to effect cut-off as referred to and which will always close and open freely, and which when closed to effect said cut-off will be absolutely liquid leak-proof, and will maintain that property without wear or deterioration over a long continued time of use.

Other objects will become apparent hereinafter to those skilled in the art to which the invention appertains.

In general, an embodiment of the invention when used with a pressure indicating gage comprises a housing divided into two chambers by a flexible diaphragm.

One chamber communicates with the actuating liquid whose pressure is to be indicated by the gage. The other chamber communicates with the gage through a passageway or conduit means containing a quantity of gage operating liquid.

Pressure of liquid in the one chamber flexes the diaphragm and communicates pressure to the liquid in the other chamber and passageway to operate the gage.

A valve is operated by flexing movements of the diaphragm; and upon attainment of a preselected maximum pressure the valve closes the passageway, cutting off communication to the gage of pressures above the maximum.

The cut-off pressure is adjustable to any desired preselected value by means operable to add to or subtract from the volume of liquid in the passageway and said other chamber.

The invention in a preferred embodiment is fully disclosed in the following description taken in connection with the accompanying drawing, in which.

Figure 2:
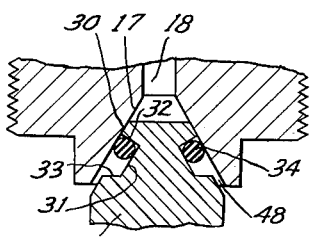
Fig. 2 is a fragmentary view similar to a part of Fig. 1, to enlarged scale, and showing in closed condition a valve shown in open condition in Fig. 1.

Referring to the drawing, there is shown at 1 a fluid pressure indicating gage. It may be of any well known or suitable construction for example a Bourdon tube gage. It has a movable needle 2 for indicating pressures on a circular scale not shown. A pipe 3 communicates with the interior of the gage, and the pressure of fluid to be described, in the pipe 3, operates the gage.

The gage 1 like all other gages of this type has, in its structure, a resilient element of means which yieldingly opposes the entrance of fluid from the pipe 3 into the gage when the pressure rises, and reacts to expel fluid from the gage into the pipe 3 when the pressure falls; such means not being shown as being well known. The resilient means is thus at all times balanced against the operating fluid pressure.

At 4 is a pipe or conduit which communicates with a fluid pressure system of any kind in which the fluid pressure varies, and is to be indicated by the gage 1.

Between the conduit 4 and pipe 3 is a device indicated generally at 5 in which is embodied part of the invention in a preferred form.

The device 5 comprises a lower body 6 and an upper body 7.

The lower body 6 is generally of upwardly open cup-form internally threaded as at 8 at its upper end portion.

The upper body is in the form of a male plug screw-threaded into the threads 8 of the lower body 6.

Between the upper and lower bodies 7 and 6 is a transverse wall element 9 generally in the form of a thick circular washer; resting at its radially outer portion on an annular shoulder 10 on the inner wall of the cup-form body 6.

A central opening 11 in the wall element 9 is surrounded on the underside of the wall element by an externally cylindrical rim 12.

In its upper side, the wall element 9 has a circular recess 13 which makes the top of the wall element 9 in the form of an annulus as at 14. A sealing ring 49 of rubber or like compressible material preferably circular in cross section lies in the recess 13.

The upper body 7 at its inner end has a shoulder 15 which engages the annulus 14 when screwed in as referred to, and clamps the wall element 9 tightly between the shoulders 15 and 10.

The upper body 7 axially thereof has a projection 16 projecting downwardly into the wall element opening 11, and a downwardly open upwardly converging conical valve seat or port 17 is provided in the projection.

A passageway 18 in the upper body 7, opens at its lower end into the port 17, and at its upper end opens into an enlargement as at 19. The upper end of the enlargement 19 is pipe-threaded as at 20 and the said pipe 3 is screwed into the threads 20 whereby the pipe 3 communicates with the passageway 18 and enlargement 19 and also provides a mechanical juncture between the pipe 3 and the device.

The passageway 18 is threaded at its upper end below the enlargement as at 21 and a screw 22 is screwed into the threads 21, access to the screw by a screw driver being had through the enlargement 19 from above before the pipe 3 is screwed in.

The screw 22 has an axial duct 23 therethrough, the lower end of which is of restricted diameter providing a passageway restriction 24 to be referred to.

At 25 is a bellows-form flexible metal diaphragm of well known type, axially contractable and expansible, disposed in the interior of the cup-form body 6 below the wall element 9 and having its axially opposite ends formed to be tubular. The upper tubular end is telescoped over the cylindrical rim 12 of the wall element 9 and soldered or otherwise sealedly mounted thereon, as at 26, the substantial axial extent of the cylindrical surface of the rim 12 and of the tubular end of the bellows providing a large sealing area and a strong juncture mechanically for mounting and supporting the bellows.

The lower end of the bellows is closed and sealed by a sheet metal head 27 preferably of cup-form, with a cylindrical skirt, whereby the skirt and tubular bellows end may be telescoped together over a substantial axial extent and soldered or otherwise sealedly secured together and provide a mechanically strong sealed juncture as at 28.

Before the head 27 is secured in place it has mounted thereon an axially elongated valve 29 so that when the head 27 is secured as described the valve is within the bellows 25 and extends upwardly axially therein.

Preferably the valve is squared off at its lower end and stands on the cup bottom of the head 27 and the cup bottom is flat, and the two are secured together by solder or the like.

The valve 29 at its upper end portion is conical as at 30 at the same cone angle as the valve seat or port 17. Below the conical valve portion 30 is a valve neck 31 of reduced diameter made by forming an annular groove in the valve 29, the bottom of the groove constituting the neck 31 and also being conical or tapered upwardly.

The groove provides upper and lower shoulders 32 and 33 on the valve at the upper and lower terminations of the neck 31.

Figure 1:
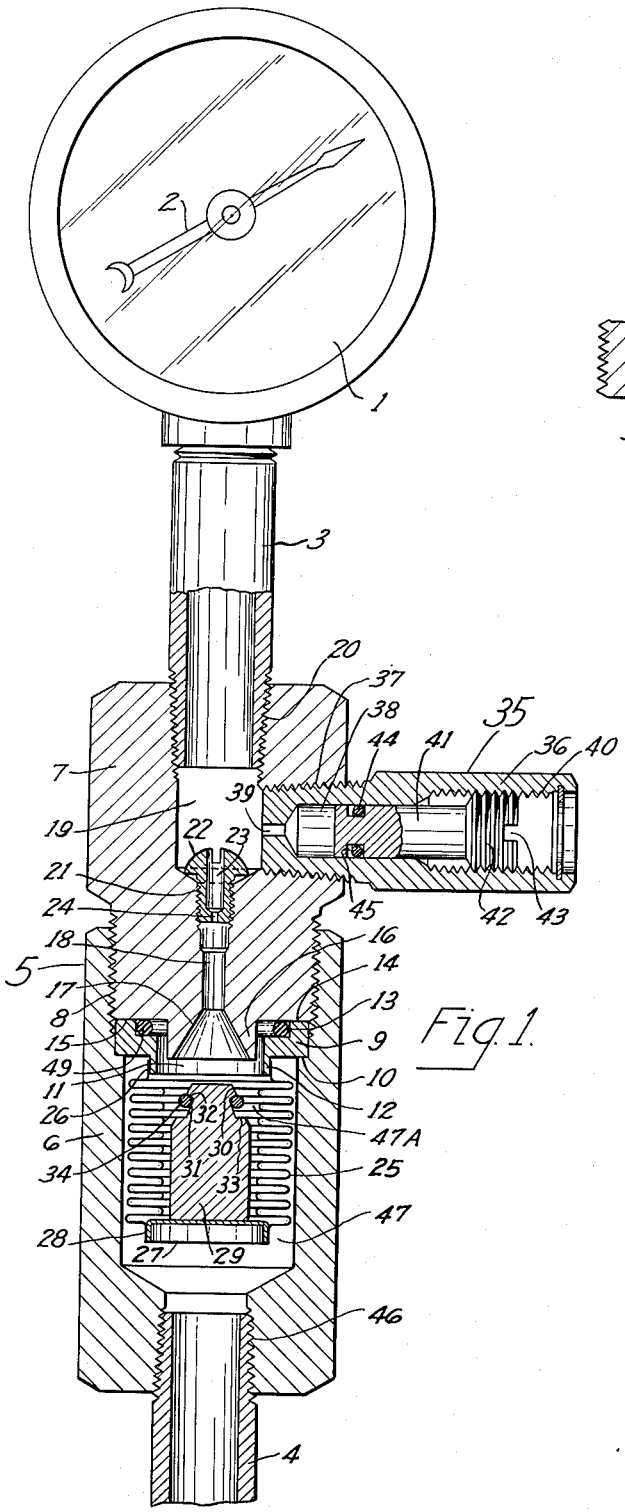
Fig. 1 is a longitudinal sectional view of a preferred embodiment of the invention.

A sealing ring 34 of rubber or like compressible and resilient material and of circular cross section circumscribes the neck 31 and is of selected diameter with respect to the diameter of the neck 31 so that its constricting resilience causes it normally, as viewed in Figs. 1 and 2 to roll or slide up along the tapering neck to the shoulder 32. The cross sectional diameter of the ring 34 is selected to be great enough so that the outside perimeter of the ring as a whole normally projects beyond the conical valve surface 30.

An adjusting device indicated generally at 35 is provided. It comprises a tubular housing 36, pipe threaded at its end as at 37 and screwed into a correspondingly threaded hole in the side of the upper body 7 at a point laterally of the enlargement 19.

The housing 36 is provided with a piston and cylinder arrangement comprising a cylindrical bore 38 which at one end communicates with a duct 39 opening into the enlargement 19 and at its other end opens into an enlarged threaded bore 40.

A piston 41 in the cylinder 38 has a threaded head 42 screwed into the threaded bore 40 provided with a screw driver slot 43, accessible through the outer end of the housing, whereby when the head 42 is turned, it propels the piston 41 inwardly or outwardly in the cylinder 38.

The piston is sealed upon the cylinder wall by a ring 44 of rubber or like compressible material, surrounding the piston, and seated in an annular groove 45 in the piston and sealedly engaging the groove bottom and the cylinder wall, and being under some compression at all times.

At the lower end of the device 5, a bore extends through the bottom of the cup-form body 6 and is pipe threaded as at 46 and the conduit 4 is screwed into the threads 46 and may serve as a support for the device 5 and the gage 1.

By the foregoing construction, a lower chamber 47 is provided in the lower body 6 on the outside of the bellows 25 to which the conduit 4 communicates actuating pressure, the upper end of this chamber being closed by the wall element 9.

The inside of the bellows 25 and opening 11 constitute an upper chamber 47A communicating with the passageway 18 through the valve seat or port 17.

The two chambers 47 and 47A may be considered as separated by the bellows wall.

When the apparatus as described is installed for operation, the conduit 4 and the lower chamber 47 outside the bellows will be under the pressure of the liquid of the system to which the conduit 4 is connected; and the pipe 3, the upper chamber 47A and the said passageway 18 and enlargement 19 and the cylinder 38 and duct 39 will be filled with operating liquid; the passageway 18 and enlargement 19 together constituting a liquid-filled conduit means to be referred to; and the gage 1 will contain part operating liquid and part air according to well known practice.

A rise of pressure in the conduit 4 will partially collapse or contract the bellows 25, moving the head 27 and valve 29 upwardly, pushing liquid out of the bellows and upwardly through the valve port 17 and passageway 18 and conduit 3 and into the gage 1 to operate it.

The said resilient means of the gage increasingly opposing entrance of liquid into the gage, will cause the pressures inside and outside of the bellows to become equal and balanced and the bellows will stop collapsing and the gage 1 will indicate the actuating pressure in the conduit 4.

Upon a fall of pressure in the conduit 4, the pressure on the outside of the bellows will be less than that inside and the bellows will be expanded by the resilient means in the gage until its concurrent weakening causes the pressure inside the bellows to balance that on the outside and the gage will indicate the reduced pressure.

Thus in normal operation, when the gage needle 2 comes to rest and indicates, the two pressures inside and outside of the bellows are always equal and in balance.

The greater the pressure communicated to the device by the conduit 4, the more the bellows collapses, and accordingly the nearer the valve 29 moves to the valve port 17. There will therefore be a maximum pressure at which the conical end 30 of the valve becomes seated on the valve seat or port 17 and shuts off communication of further pressure to the gage.

This is one of the primary functions of the device. A gage of the type here considered has parts that will be irreparably damaged, so that it will no longer indicate at all, or will indicate inaccurately, if the gage is subjected to pressure greater than the maximum for which the gage was designed.

A rise to such excess pressures may occur in the liquid pressure system to which conduit 4 is connected, due to various causes, and may be a gradual rise or a sudden surge or peak of pressure; but in any case, the invention here described protects the gage from such excess pressure by the closing of the valve port 17, at a predetermined safe pressure.

In normal operation in the range of pressure safe for the gage, there may often be small peaks or rapid fluctuations of actuating pressure in the conduit 4, which would tend to make the gage needle vibrate or move so rapidly as to make reading inaccurate. The restriction 24 in the passageway 18 reduces the possible rate of flow to a low rate and damps out or irons out these fluctuations so that the needle gives non-vibrating or "dead-beat" indications.

If the actuating pressure in the conduit 4 should rise and close the port as described, and then go on up to an excess pressure and persist at the excess pressure for a considerable time, any leakage at the closed port would defeat its gage protecting purpose; because even a very slight creepage of liquid around the valve would ultimately communicate the full destructive pressure to the gage.

The valve as described hereinbefore is absolutely leakproof even when subjected to very great pressures far beyond the safe gage pressure for an indefinitely long time, as will now be explained.

The sealing ring 34 as shown is of larger diameter than the conical valve portion 30 above it so that it engages the valve port 17 first. Further rise of the valve will compress the ring 34 more and more between the valve port 17 and the tapering neck 31 of the valve, and the conical portion 30 of the valve will finally engage the valve seat and stop further valve movement, and take the full upward thrust of the valve at higher pressures, see Fig. 2.

If there should be any leakage from the lower chamber 47 into the upper chamber 47A or opening 11 due to leakage through the soldered junctures at 28 or 26, or due to leakage around the perimeter of the wall element 9, the pressure in the central opening 11 might rise to a high value. This pressure, however, when the valve is in the closed position of Fig. 2, is communicated to the underside of the ring 34 and compresses it more tightly against the valve seat 17 and valve neck 31 increasing the sealing action of the ring 34. The valve 29 as best shown in Fig. 2 below the neck shoulder 33 is of smaller diameter than the valve seat 17 leaving an annular passage 48 to insure that said leakage if any will have free opportunity to compress the ring and effect perfect seal.

The conical portion 30 of the valve 29 fitting the conical valve seat 17, is not intended to be a sealing fit, the seal being effected by the ring 34, and the seal of the ring being automatically made more and more tight correspondingly with greater and greater pressures by compression and distortion of the ring; and the rigid engagement of the valve with the valve seat at 30—17 prevents the ring from sliding up and down on the valve seat with changes of the excess pressure which might unduly wear it by friction.

The ring 34 when sealingly compressed as described will not be mutilated or sheared or have its sealing surface marred no matter how high the pressure to which it is subjected, because it is compressed into a smooth walled annular pocket comprised by the shoulder 32, neck 31 and valve seat 17, and there are no crevices into which it can be forced.

The ring 34 is further protected as follows in another manner by the described construction, to insure its having a smooth unmarred sealing surface during long use.

When the valve opens, it may open suddenly due to a sudden drop of actuating pressure in the conduit 4. The spring reaction of the gage would then suddenly discharge liquid downwardly through the valve seat 17. At this time, the discharged liquid has a free passageway around the outside of the ring 34 and through the passageway 48. The ring may be propelled thereby along the neck 31 and stopped upon the shoulder 33, but will be concurrently expanded by the increased diameter of the neck 31 at the shoulder 33 and be held tightly on the neck against the shoulder 33 and there will be no liability that it will be forced to follow the discharge flow into the passageway 48 or be otherwise distorted in a way that might damage it.

After such discharge of liquid has ceased, the ring 34 will roll upwardly on the neck 31 due to the taper of the neck and be returned to its original position.

It is desirable that the quantity of liquid in the upper chamber 47A and in the passageway 18 and in the gage 1 be maintained without loss due to leakage. Any leakage therefrom would obviously change the cut-off pressure value. There is a path for such leakage, from the opening 11, and laterally over the wall element 9 and out by way of the threads 8, or (when the pressure in the chamber 47 is suddenly reduced) around the perimeter of the wall element 9 and into the lower chamber 47. All such leakage is prevented by the sealing ring 49 lying in the recess 13 of the wall element 9.

This ring of rubber or like compressible material is of such outside diameter as to fit within the rim 14 and of such cross sectional diameter as to be put under compression by the shoulder 15 of the upper body 7 when the latter is screwed in tight against the rim 14.

The ring 49 is subjected to the pressure of the liquid in the central opening 11 and is compressed into tight sealing engagement with the walls of an annular pocket comprising the bottom of the recess 13, the rim 14, and the surface 15 of the upper body, and completely seals against any leakage from the opening 11 as referred to.

As mentioned hereinbefore, it is a part of the invention to be able to preselect the maximum pressure at which the valve will close and protect the gage. This is effected by adjusting the device 35 by screwing the piston 41 in or out, and thereby changing the volume of liquid in the above identified conduit means 18—19. The adjustment can best be made in the factory, but can be made in the field when the pressure in the conduit 4 can be controlled or changed at will.

Let it be assumed for example that the maximum pressure to which the gage can be subjected without damage to it is selected to be 1000# (per square inch). Accordingly when the pressure in the conduit 4 is applied to the lower chamber 47, the pressure will be adjusted in any suitable manner to be 1000#, and the gage will indicate 1000#.

At this time the pressures in the upper and lower chambers 47 and 47A will be equal and balanced at 1000# and the valve 29 will be below the valve seat.

If the piston 41 now be adjustably withdrawn in the cylinder 38, by a small increment, by turning the threaded head 42, liquid in the enlargement 19 will be pulled into the cylinder 38 through the duct 39.

The instantaneous effect of this will be to reduce the pressure in the passageway 18 and upper chamber 47A below that in the lower chamber 47 (which is 1000#) and cause the gage to indicate less than 1000#.

But the bellows 25 will immediately be contracted by the predominating pressure in the lower chamber 47, until the pressure balance in the two chambers is again restored at 1000# each, and the gage will again indicate 1000#.

During this contracting of the bellows, the valve 29 is raised to a higher position nearer the valve port 17.

By successive increments of such adjustment, the valve 29 moves higher and higher and finally reaches the valve port and closes it, with the gage still indicating 1000#.

The operator by watching the gage will be informed when the port is closed, as follows. Upon making another increment of adjustment, the pressure in the upper chamber 47A will be reduced but this time the pressures in the two chambers cannot become balanced again because the valve port is closed; and the gage will indicate less than 1000# which the operator observes.

Then by reversing the adjustment, by turning the threaded head 42 in the other direction, the piston 41 will push liquid back into the enlargement 19 and restore the pressure in the upper chamber until the gage again indicates 1000#.

The adjustment thus causes the gage to indicate 1000# with the valve in port closed position. After the adjustment has been made, and the apparatus is in operation, the pressure in the conduit 4 may rise above or fall below 1000#. Conduit pressure above 1000# in the lower chamber 47 will predominate over the 1000# pressure in the upper chamber 47A and hold the valve in port closed position, and the greater pressure will not be communicated to the gage, and it will continue to register 1000#. At a conduit pressure value lower than 1000#, the 1000# pressure in the upper chamber 47A will predominate and body 6, wall element 9 and bellows 25 would be made of stainless steel or other corrosion proof material.

As mentioned, the indicating instrument 1, may be of any desired type having a chamber into which operating fluid is forced, and spring means reacting against the fluid pressure, including instruments of the Bourdon tube type.

In some cases the instrument chamber intentionally contains both air and liquid, because of probable thermal expansion of the liquid.

The present invention operates as described in such cases; and it therefore is not essential for all air to be excluded from the aforesaid upper chamber 47A.

| 2,481,482 | Green | Sep. 13, 1949 |
| 2,538,133 | Tratzik | Jan. 16, 1951 |
| 2,569,027 | Stoner | Sept. 25, 1951 |
| 2,607,220 | Martin | Aug. 19, 1952 |
| 2,627,183 | Greenwood, Jr., et al. | Feb. 3, 1953 |

FOREIGN PATENTS

| 4,037 | Great Britain | Mar. 7, 1891 |
| 867,815 | France | Sept. 1, 1941 |